(12) United States Patent
Kiselev et al.

(10) Patent No.: US 11,663,199 B1
(45) Date of Patent: May 30, 2023

(54) APPLICATION DEVELOPMENT BASED ON STORED DATA

(71) Applicant: Amazon Technologies, Inc., Seattle, WA (US)

(72) Inventors: Oleg Kiselev, Los Altos, CA (US); Arihant Sethia, San Jose, CA (US); Xiao Ma, Mountain View, CA (US); Amit Agarwal, Milpitas, CA (US); Rajesh Goli, Fremont, CA (US); Sapna Rai, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,383

(22) Filed: Dec. 10, 2020

Related U.S. Application Data

(60) Provisional application No. 63/042,973, filed on Jun. 23, 2020.

(51) Int. Cl.
  *G06F 16/23* (2019.01)
  *G06F 16/22* (2019.01)
  *G06F 8/36* (2018.01)
  G06F 3/04842 (2022.01)

(52) U.S. Cl.
  CPC ............ *G06F 16/2379* (2019.01); *G06F 8/36* (2013.01); *G06F 16/2282* (2019.01); *G06F 3/04842* (2013.01)

(58) Field of Classification Search
  None
  See application file for complete search history.

(56) References Cited

U.S. PATENT DOCUMENTS

| | | |
|---|---|---|
| 8,516,008 B1 | 8/2013 | Marquardt |
| 8,682,925 B1 | 3/2014 | Marquardt |
| 9,619,210 B2 | 4/2017 | Kent |
| 10,546,001 B1 | 1/2020 | Nguyen |
| 10,705,805 B1 * | 7/2020 | Bosworth ................. G06F 8/34 |
| 10,901,990 B1 | 1/2021 | Vogelsgesang |
| 10,977,211 B2 | 4/2021 | Nag |
| 11,221,994 B2 * | 1/2022 | Trim ....................... G06F 16/93 |
| 2004/0088650 A1 | 5/2004 | Killen |
| 2005/0187897 A1 | 8/2005 | Pawar et al. |
| 2005/0256835 A1 | 11/2005 | Jenkins, Jr. |

(Continued)

*Primary Examiner* — Dawaune A Conyers
(74) *Attorney, Agent, or Firm* — Knobbe, Martens, Olson & Bear LLP

(57) ABSTRACT

Systems and methods automatically generate a low input visualization of data updated in a workbook. One aspect describes a computer-implemented method comprising obtaining a request to update data in an application workbook for an application. The request comprises an indication of a type of update being requested and at least a subset of the data being updated. The method further comprises performing the update of the data in the application workbook and determining that the performed update of the data in the application workbook results in a change to a visualization of the data. The method also comprises generating an updated visualization based on the received request and the updated application workbook and generating a confirmation message that the updated visualization has been generated, wherein the updated visualization is generated automatically based on the update of the data.

23 Claims, 6 Drawing Sheets

(56) References Cited

U.S. PATENT DOCUMENTS

| | | | |
|---|---|---|---|
| 2006/0101391 A1* | 5/2006 | Ulke | G06F 8/00 |
| | | | 717/107 |
| 2006/0112123 A1* | 5/2006 | Clark | G06F 40/18 |
| 2006/0212469 A1 | 9/2006 | Babanov et al. | |
| 2007/0255512 A1 | 11/2007 | Delenstarr | |
| 2008/0162426 A1 | 7/2008 | Haug | |
| 2008/0256432 A1 | 10/2008 | Sambandam et al. | |
| 2009/0012974 A1 | 1/2009 | Cassidy | |
| 2011/0113048 A1 | 5/2011 | Njemanze | |
| 2011/0167056 A1 | 7/2011 | Khanolkar et al. | |
| 2012/0008401 A1 | 1/2012 | Katz et al. | |
| 2013/0086064 A1 | 4/2013 | Salch et al. | |
| 2013/0117651 A1* | 5/2013 | Waldman | G06F 40/177 |
| | | | 715/220 |
| 2013/0262974 A1 | 10/2013 | Anstis et al. | |
| 2014/0279962 A1 | 9/2014 | Schreter et al. | |
| 2015/0120748 A1 | 4/2015 | Kraynak et al. | |
| 2015/0199378 A1 | 7/2015 | Reyntjens | |
| 2015/0363725 A1 | 12/2015 | Andersson | |
| 2017/0140000 A1 | 5/2017 | Mielenhausen | |
| 2017/0228460 A1 | 8/2017 | Amel | |
| 2017/0315979 A1 | 11/2017 | Boucher et al. | |
| 2018/0157468 A1 | 6/2018 | Stachura | |
| 2018/0203924 A1 | 7/2018 | Agrawal | |
| 2018/0375805 A1 | 12/2018 | Sethi | |
| 2019/0079968 A1* | 3/2019 | Griffith | G06F 16/242 |
| 2019/0146998 A1 | 5/2019 | Jin | |
| 2019/0147031 A1 | 5/2019 | Dvorak | |
| 2019/0384762 A1 | 12/2019 | Hill | |
| 2020/0057819 A1 | 2/2020 | Mathur | |
| 2020/0250166 A1 | 8/2020 | Mathur | |
| 2021/0089537 A1 | 3/2021 | Hanson et al. | |
| 2021/0157812 A1 | 5/2021 | Rumiantsau | |
| 2021/0304146 A1 | 9/2021 | Helft et al. | |

\* cited by examiner

APPLICATION DEVELOPMENT BASED ON STORED DATA

BACKGROUND

Computing devices can utilize applications ("apps") to view, update, and/or exchange data, for example via a communication network. Applications are usually created by software developers, who utilize coding languages to create the application. A variety of types of applications exist. For example, a desktop application can include code executable by a traditional fully-fledged operating system (e.g., a desktop or a laptop), a mobile application can include code executable on a mobile device, and a web application can include code executable in a web browser (which itself is an application executing on a device). Application development, particularly of network-accessible services, is generally complex. Typically, such applications include both a "frontend"—portions of code executing to provide a user interface—and a "backend"—portions of code executing at a network-accessible location to provide data and functionality to the interface, each of which can include many modules, services, data stores, etc., that interoperate to provide the application It takes a relatively high level of experience to coordinate all such components to provide a fully functional application.

DETAILED DESCRIPTION

Figure 1:
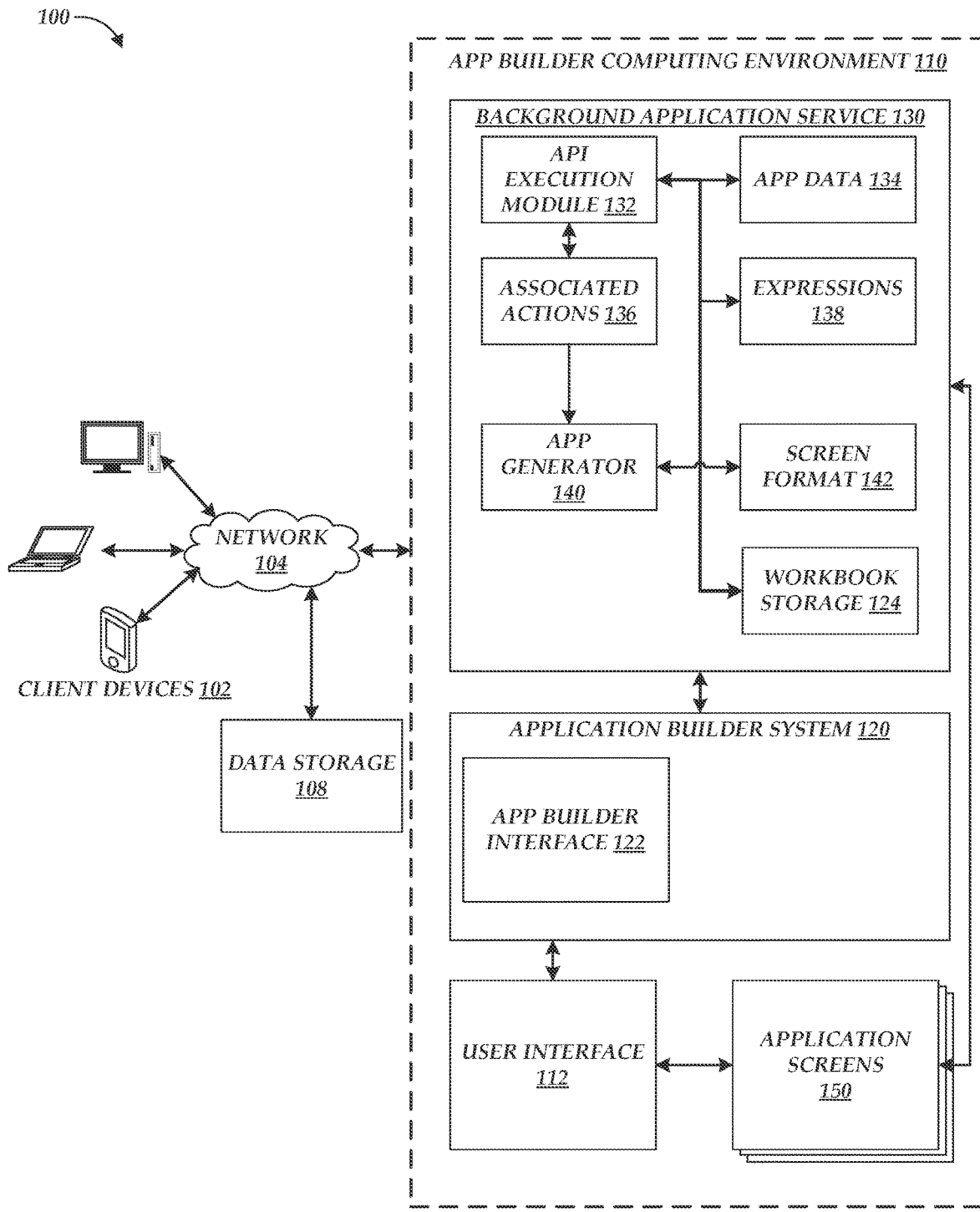
FIG. 1 is a block diagram depicting an illustrative environment in which client devices may interact with an application builder computing environment, which provides a zero or low input application creation system for use by one or more users.

Generally described, aspects of the present disclosure relate to facilitating generation of a zero or low input application (or an autonomous application) under various conditions. Specifically, as described herein, a service is provided that enables users to create network-accessible applications using intuitive interfaces that are recognizable to those without software development expertise, such as spreadsheet interfaces that are familiar to many non-technical users. As discussed below, applications created by the services disclosed herein may include three general types of components: spreadsheets, which act as data storage components; views, which act as user interface components; and automations, which act as data processing components. In combination, these three types of components can provide a fully functional application. For example, views may enable an end user to view data stored within a spreadsheet and/or to enter new data, which may be processed by an automation to populate additional data within a subsequent view. Moreover, embodiments of the present disclosure can enable the creation of network-accessible applications based solely or almost solely on creation of a spreadsheet. Specifically, a service as disclosed herein as zero or low input can be configured to analyze data placed into a spreadsheet by a user, and to select based on a format and structure of that data from a number of pre-defined templates, which designate views and automations to be used for a generated application. In some instances, the template may further be selected based on user input, such as completion of a guided questionnaire that inquires as to the nature of the data and the desired application. Thereafter, the service can generate an application that provides the views and automations, as linked to the created spreadsheet. In this way, any user familiar with basic spreadsheet operations can be enabled to create a web-based application. In some instances, a "default" application may be provided that is strongly synchronized to the format and structure of a spreadsheet, such that changes to the format and/or structure result in the programmatic updating of the default application. In this way, the default application can be seen by the user as "constantly up to date," providing a default mechanism to access, via an application, data of the spreadsheet.

As described herein, the zero or low input application is a web or mobile application or application representation that is created with little or no input from the author and based primarily on data provided without requiring the author to code anything. The zero or low input application may generally require little or no coding experience or expertise for the author to create. No- and low-code development approaches for generating the zero or low input application may be one or more of largely visual, prompt-based, and/or automatic such that authors can quickly and efficiently create the applications for web and mobile based view, regardless of the coding and development knowledge of the authors. For example, some no- and low-code development approaches use automatic procedures and/or drag-and-drop components with model driven logic to generate the zero and low input applications. The zero and low input applications may be generated in a software-based application development environment that creates applications automatically without user input and/or with minimal or guided input. Such an approach to application development allows the authors with little or no development experience to quickly generate the web and/or mobile applications associated with data entered by the authors by relieving the authors of the need to write any code or understand steps to generate screens for the web or mobile application based on data in the workbook. As described herein, the workbook may comprise a database or other data storage structure, such as a spreadsheet or a collection of spreadsheets. The zero or low input applications described herein may be distinct from the workbooks in that the zero or low input applications provide a view of data in the workbooks but limit editing of the data. Thus, via the workbook, the author will have access to make changes to the data, data structure, automations, and so forth, whereas the zero or low input application may provide limited options to edit anything except for deletion or addition of data values.

Many authors have data stored in spreadsheets or similar formats (for example, as a workbook) and wish to build web or mobile applications for other users to use, but have little or no technical knowledge regarding applications and have no desire to learn how to code applications. The systems and methods described herein enable the authors to develop such applications with little or no coding or technical expertise. For example, the systems and methods described herein provide a computing environment through which the author can easily view and modify data in a database view, similar to typical spreadsheet views. The computing environment may also provide the author with an application builder system that enables the author to create applications with little to no inputs, for example by dragging and dropping application elements, to attract users and enable users to interact with the data in the workbook. The computing system may also enable the author to automate business processes and/or workflows and application process flows, such as sending an e-mail when a condition in the data is met, adding a column or row if a condition is met, and so forth. In some embodiments, adding the column is changing a structure of a corresponding table while adding the row is not changing the structure, or vice versa. For example, when the columns of the table identify information or fields provided for each entry in the table, adding a column changes the structure of the table while adding rows does not. As such, adding the row of information to the table may not result in regenerating or modifying views in the no or low input application. When the rows identify information or fields provided for each entry in the table, adding the row changes the structure of the table while adding columns does not. As such, adding the column of information may not result in regenerating or modifying views in the no or low input application. Further explanation is provided below with reference to FIGS. 5A and 5B. Thus, authors having knowledge of interacting with data in spreadsheets and using corresponding expressions may use the systems and methods described herein to create the desired mobile or web applications and associated automations based on their data.

As described herein, the zero or low input applications may have different properties. In some approaches for generating such applications, the zero input application corresponds to an application that is automatically made available to the author (for example, via an application builder software) and that provides access to view and/or manipulate corresponding data in the application workbook (for example, data stored in a spreadsheet as a table). The zero input application can be created automatically when the corresponding data is created and/or stored in the workbook and updated automatically when the corresponding data is updated in the workbook with no input (aside from the updating of the data) from the author, hence the "zero input" moniker. Alternatively, the low input application can be created based on a request to create the application from the author, after which little or no additional input is required from the author to create the application, hence the "low input" moniker. Either of the zero and low input applications may provide an automatically updated application view of the workbook and any data, relationships, and so forth, in the workbook. In some embodiments, the low input applications may be built on a client device and uploaded to the application builder system. For example, the client may generate or select one or more views or automations and upload them to the application builder system for use with the data in the workbooks.

In some embodiments, the application builder software does not explicitly create the zero or low input application as a standalone or fully functional application but rather creates exemplary views of screens, etc., that could exist in such an application providing access to the corresponding workbook data. For example, when the author inputs a table of data into the application builder software with the zero input functionality, the application builder software generates the zero input application (or the screens representative of the zero input application) for viewing and/or input by the author of the corresponding workbook so that the author can understand how the data input will be visualized in the application. The generated zero input application may comprise a single screen view including a list of rows and columns derived from the input table of data or comprise a collection of screen views with navigation capabilities.

The zero input applications generated by the application builder software may be editable by the application builder software and, therefore, by the author. This may be due to the automated nature of the generation of the zero input applications, where the automatically generated zero input applications have limited functionality to enable their prompt generation and availability for viewing by the author. Should the author desire to make any updates to the zero input application (for example, change one or more of a layout of a screen, a navigation path between screens or links within a particular screen, or actions within the zero input application), the application builder software enables the author to copy (for example, using a backend service, such as a sheets data service ("SDS")) the zero input application and present the copied application for editing by the author or another user. The backend service may provide API gateways, workbook load and checkpoint mechanism, a notifications system, an "in-memory database" platform where the workbooks are held while in-use, and formula and expressions evaluation mechanism, among other components. The backend service may include a number of interacting multi-host services, one of which may create the zero-input and/or low-input applications described herein. The backend service may create or update the zero- and/or low-input application in response to one or more triggers, including a trigger that is determined to alter a structure of the workbook, among other actions taken in response to such triggers. Generally, changes made to the copied application will not impact the source zero input application, though the author may be able to set and/or update default settings (for example, fonts, formatting, placements of text, and so forth) for the zero input application. The application builder software may be configured such that the zero input application is always available to the author for reference when manipulating and/or generally working with the data in the workbook (for example, in a windowed view while the author is editing the data and/or parameters of the data). Additionally, the author can publish one or both of the zero input application or the copy of the zero input application.

When the application builder software generates the zero input application as the application as opposed to simply views of the corresponding screens, the application builder software may selectively use the generated zero input application or create a new application based on the zero input application or another action. The copying of the zero input application with limited functionality may provide the user with a basis for learning how applications are constructed and how functions of the zero input application (and, by association, applications in general) work. Accordingly, the zero input application may serve as a tool for the author to learn how to create and modify applications. Additionally, the zero input application may save the author time by allowing the author to identify issues with the display of entered information without having to spend time actually generating the application with appropriate visual features.

The application builder software updates to the zero input application may trigger based on updates to the workbook (for example, modifications to the data or formatting of the data in the workbook) such that the zero input application immediately reflects changes to the workbook (i.e., is updated in real-time). For example, the zero input application will be available in the workbook automatically when the table of data is created in the workbook or after the user requests the zero input application be generated. The application builder software may handle creation or modification of the zero input application as part of a data write step when data is written to the workbook. By integrating aspects of creating or updating the zero input application into the data update steps of the workbook, the application builder software will ensure to update the zero input application any time the workbook is updated. The zero input application may also provide the user with simple operations beyond browsing data from the workbook, for example adding data to the workbook and viewing more detailed information of data shown on the screen. Such operations (for example, navigation between screens or data, addition of data, and so forth) may occur immediately. For example, when data is added via the zero input application, the application builder software may handle receipt of data via the zero input application, creation or modification of data in the workbook, and creation or modification of data shown in the zero input application as part of a data write step when data is written to the workbook via the zero input application. The added data may be shown immediately on the screen or after an update of the screen.

While the zero input application may have limited functionality, customization, and flexibility, the zero input application is not limited thereto. The zero input application may have options allowing the author to adjust what data from the workbook is shown in the zero input application (for example, only a specific number of tables or a maximum number of rows or columns to display on a single screen, a landscape or portrait layout of the screens, navigation parameters between screens and data, fonts, color, and other text formatting, what text to show in the zero input application, and so forth). More complex functionality, for example comparative actions and relationship based actions may be added as desired and appropriate, for example as automations described herein.

As noted herein, many authors have experience working with spreadsheets and similar data organization structure. However, many of these authors lack technical capabilities to create applications to enable others to access data and/or create automations to enable actions in response to triggers in the data due to the complexities in creating such applications and automations in a traditional manner. Such capabilities may require knowledge in generating application views or interfaces as well as backend services that enable data in the views to reference data in the workbook or in creating automations that reference data for a trigger before performing a related action. The systems and methods described herein provide a solution to the problem of lack of technical capabilities by eliminating the need for such technical capabilities. For example, by automatically generating applications and automations based on data in a workbook using templates, the author needs only to know how to interact with a spreadsheet or other database. In some aspects, the application builder system may generate zero or no input applications using atomic operations to ensure that the generated applications are always up to date. When the zero input application is generated automatically in the windowed view, the windowed view may be blank or empty before data is added to the workbook. Once data is introduced into the workbook, the windowed view may be automatically updated to show a view of the introduced data.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with an application builder computing environment 110 via a network 104, which provides a zero or low input application creation system for use by one or more users. By way of illustration, various example client devices 102 are shown in communication with the computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, smartwatch, and the like. The computing environment 110 may provide the client devices 102 with one or more user interfaces 112, command-line interfaces (CLIs), application programing interfaces (APIs), and/or other programmatic interfaces for utilizing services provided by the computing environment 110, including an application builder system 120, and application screens 150. Although one or more embodiments may be described herein as using the user interface 112, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the computing environment 110 or provide services (for example, data storage and the like) to the computing environment 110.

The client devices 102 and computing environment 110 may communicate via the network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing environment 110 as depicted in FIG. 1 may operate in a distributed computing environment including several computer systems that are interconnected using one or more computer networks (not shown in FIG. 1), which systems operate to provide an application builder system 120, a background application service 130, and application screens 150. Illustratively, the computing environment 110 includes a number of rapidly provisioned and released computing resources configured to provide the application builder system 120, background application service 130, and application screens 150. The computing environment 110 may also be referred to as a "cloud computing environment." Each of the application builder system 120, background application service 130, and application screens 150 could also operate within a computing environment having a fewer or greater number of devices than are illustrated in FIG. 1. Thus, the depiction of the application builder system 120, background application service 130, and application screens 150 in FIG. 1 should be taken as illustrative and not limiting to the present disclosure. For example, the elements of the computing environment 110 or various constituents thereof could implement various Web services components and/or peer to peer network configurations to implement at least a portion of the processes described herein. In some instances, two or more of the application builder system 120, background application service 130, and application screens 150 may be combined into a single service. Each of the application builder system 120, background application service 130, and application screens 150 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

The application builder system 120 can provide, for the benefit of authors and access by client devices 102, an interface by which the author generates web or mobile applications having application screens 150. Within the computing environment 110, the application builder system 120 may provide application building services to any client device 102 via the network 104. In some embodiments, while labeled as a system, the application builder system 120 may represent one or more services. The application builder system 120 enables authors and users to create, modify, access, or use web and/or mobile applications via the client devices 102. The application builder system 120 may provide the author access to an application builder interface 122, through which the author may selectively create new applications or access, modify, or user existing application workbooks. The application builder system 120 may store created and existing application workbooks in a workbook storage 124, which may comprise a data storage device. While shown in FIG. 1 as part of the background application service 130, the workbook storage 124 may alternatively be included in the application builder system 120, or may be shared among the background application service 130 and the application builder system 120. In some embodiments, the application workbook may include all aspects of an application, including application data, navigation policies, restrictions on accessibility, cross-references, associated files, and any other features or details of the application. The application workbook may be stored in the workbook storage 124 to simplify access to and management of any associated applications and the corresponding data. In some embodiments, the application builder interface 122 is separate from the user interface 112 of the computing environment 110, for example as an embedded webpage or similar interface within the user interface 112. Alternatively, or additionally, the user interface 112 and the application builder interface 122 are integrated into a single interface, for example where the user interface 112 is also used to interact with application workbooks.

The user interface 112 of the computing environment 110 and/or the application builder interface 122 may enable the author to access the application builder system 120 to create new applications edit and manage existing applications. The application builder system 120 enables the author to create and/or edit workbooks in the workbook storage 124. The application builder system 120 may be integrated with the background application service 130. The application builder system 120 may activate, select, or utilize an API that is executed by the background application service 130. The background application service 130 may include various modules, including an API execution module 132, an application data module 134, an associated actions module 136, and an expressions module 138.

Actions, as described herein, may correspond to steps taken or performed by the backend service in response to a button being pressed or other action being initiated by the user in the no or low input application. The actions can cause data to be modified (for example, via an "apply changes" button in the application), added (for example, via an "add" button in the application, which may result in data being added and modified in one or multiple tables), or deleted, and so forth. The actions may also perform navigation effects that can cause the application to navigate to another application screen. Expressions, as described herein, can reference data stored in the spreadsheet and may include references to data provided by the user through the apps (for example, local variables). The expressions effectively extend the concept of a "formula" as understood with respect to spreadsheets all data accessible by the applications, including spreadsheet data and data external to the spreadsheet but still affiliated with the overall data of the application. The expressions exist in their own namespace, outside of the spreadsheet and are designed to be accessed through the application implementation. The expressions can be evaluated/computed on demand when the application (or automation) refers to the expressions, and results from the evaluation/computation of the expressions are used by apps to display data or use the result in some other operation.

The API execution module 132 may perform one or more actions based on the API activated by the application builder system 120, for example storing the input or imported data via the application data module 134. The API execution module 132 may perform one or more actions associated with the API using the associated actions module 136, such that the activated API results in associated actions occurring. Examples of actions in the associated actions module 136 include table creation, table deletion, table renaming, table moving, column/row addition, column/row deletion, column/row rearrangement, column/row renaming, table/column/row metadata updates, and so forth. Each of these actions in the associated actions module 136 may be associated with APIs executed by the API execution module 132. Other modules may be contemplated or shown modules may be integrated, though not shown in FIG. 1. In some aspects, the background application service 130 may generate a specification document of display and interaction actions that control how and what the web and mobile runtimes show to users. In some embodiments, the web and mobile runtimes maybe written in Typescript and Javascript, respectively, or similar formats. The background application service 130 may generate the specification document as or in JavaScript Object Notation (JSON) with various sections handled as sections. The backend system may be written in Java or a similar coding language. The background application service 130 may be written in Java. The process of generating or modifying the zero or no input application (for example, via the JSON) may occur as part of a transaction that modifies the workbook structure. This transaction may also result in publishing the generated or modified application views for interaction by users. In some embodiments, the application determines or identifies what information, controls, and so forth are presented to users via the corresponding web and/or mobile runtimes or views and may be associated with and/or stored in the workbook. Thus, in some embodiments, the generation or updating of the application view by the background application service 130 may comprise generation or updating of the corresponding JSON documents. In some embodiments, these JSON documents may comprise configuration files for existing code or new code and may be generated by the background application service 130 in Java. In some embodiments, the JSON documents may include configuration details and/or new code, such that the background application service 130 generates new code or new views or configuration information for existing code or views.

As described herein, runtimes for the web and mobile no or low input applications may interact with the backend services through specific API calls, for example a "LoadData" API call, which may be a "read" operation and/or an "ExecuteData" (or similar) API call, which may be a "write" operation.

The background application service 130, generally, may take features created in the workbook and perform various actions based thereon using the API execution module 132, the associated actions module 136, and so forth. For example, if a table is created in the workbook (imported from another file or entered by the author), the application builder system 120 may activate a table creation API, which causes the background application service 130 to execute a table creation action from the associated actions module 136 and store the created table data in or according to the application data module 134 and/or apply any expressions (for example, one of the expressions from the expressions module 138) to the data. One of the associated actions of the application modules 136 may be creating a zero or low input application via an application generator 140. The application generator 140 may be activated by any API executed by the API execution module 132 that results in changes to data (for example, added data, deleted data, modifications to formatting, and the like).

In some embodiments, when the table is created in the workbook, the background application service 130 (by the API execution module 132) may analyze row data, column data, data filters, row links, column links, picklists, and so forth as part of the API execution process when the API is a table creation API activated by the application builder system 120. The API execution module 132 may derive one or more actions or modules for the table being created and may extract table data and derive associated actions from the associated actions module 136 and expressions from the expressions module 138.

When one of the associated actions for the executed API is the application generator 140, the application generator 140 will generate a list of screens or screen representations based on the API being executed. The application generator 140 may generate the applications such that the data displayed in the applications is representative of the data in the workbooks. For example, the applications generated by the application generator 140 may reference data in the workbook or use the workbook as the source for data displayed, thereby pulling data from the workbook. The screens or screen representations may comprise a list of rows with columns and filter expressions or a more complex view with navigable actions and customizable filters. The screens or screen representations may be formatted by a screen format module 142 for presentation (for example, converted to a particular type of code, etc.) on the user interface 112 or the application builder interface 122. Thus, as another example, if the application builder system 120 activates a column add API for a table, the background application service 130 updates the table data in the app data module 134 by adding a new table column and the associated actions module 136 may employ the application generator 140 to generate or update screens that include the newly added column. The activation of the application generator 140 may be automatic any time data in workbook is updated or selectable by the author. In some embodiments, the application generator 140 and the screen format module 142 may generate a single application per data or format change in the workbook and each application may have a single screen or screen representation. In some embodiments, the application generator 140 generates the zero input application such that the author or user can add data, update data, update formatting, add rows/columns, delete rows/columns, and so forth, via the zero input application once generated.

In some embodiments, the application generator 140 generates the zero input application with multiple screens. The generated zero input application may be configured to allow navigation between screen, pagination of data, sorting of data in displayed tables and lists (for example, sorting alphabetically or numerically). In some embodiments, the application generator 140 generates the zero input application having advanced filters, actions, and expressions support, picklist support. The application generator 140 may also generate a single zero input application for multiple tables added or edited, for example based on a predefined relationship. In some embodiments, the application generator 140 may integrate search functionality in the generated screens and/or enable feeds in the generated screens.

Creating new applications may comprise creating the workbook and corresponding information for a new application. Editing and managing existing applications may comprise amending, deleting, or otherwise changing data or formatting of data in the workbook or changing a visual representation of the data in screens of the application.

When newly created, the workbook may not include any data or associated application screens or visual representations. Thus, while an author working with the new workbook may know how to add data to the workbook (for example, manually creating a table or similar structure of data or importing data), the author may not have the knowledge or understanding of how to actually create the application screens and other interactive elements based on the data in the workbook. For example, the author may not know how or what to do in order to build basic things (e.g., forms, screens, and so forth) in the workbook. Furthermore, the author may be further hindered by not knowing how to apply concepts he/she does know (for example, as learned during a training or on-boarding) to a current, own use case. Such use cases may include data modeling, generating or building an application (for example, a web or mobile application) based on data uploaded to the workbook, and connecting workflows to applications and/or workbooks or sheets, among others. Authors often have difficulty making the transition from importing data and creating the corresponding application. While sample applications or wizards or tools may be helpful, even such features take time or may be overwhelming to learn.

Experienced authors may face challenges of working with workbooks via traditional application builder systems. For example, such authors may find that simple tasks are tedious. For example, creating a summary tables, or list and corresponding detailed web or mobile application requires too much effort (for example, takes too many clicks) and is repeated often. As such, customizing sample, draft, or template applications may be easier than building the applications from scratch and discovering proper use of commands (for example, how to use context passing), patterns (how to create a poll), and so forth in application building may be difficult when there is nothing (for example, no samples, etc.) to learn from. Additionally, even if created samples built by others are available, the author may be unable to customize the available samples where such customization is tedious (for example, adding bindings to new columns by looking up all the right screens, and so forth). Furthermore, authors of applications can only use existing applications as designed by authors of the applications. The authors may not be able to use the application builder system 120 to its fullest capabilities in the same way as the application authors when the authors want to add new features or screens to existing applications. For example, in an expenses related workbook, a corresponding application may include a summary table for particular users but not include such a table for other users. If one of the other users wishes to access the summary table when they do not belong to the appropriate group, that other user may need to work with the author of the corresponding application to enable such access.

The systems and methods described herein and enabled by the application builder system 120 provide solutions to the issues identified above.

For example, the application builder system 120 may address these issues for new authors by providing an immediate view of data entered or imported by the author to the author and other users. For example, if the author uploads a spreadsheet or workbook, the application builder system 120 may analyze the uploaded or entered data and automatically determine what kind of data structure exists in the uploaded or entered data. The application builder system 120 may then automatically create a screen corresponding to the tables. The application builder system 120 may then create the application screens with a list, detail, and form view for each of the tables detected in the uploaded or entered data. In some embodiments, the application builder system 120 receives indications of tables existing in the workbook. The application builder system 120 may then create the application screens with list, detail, and form views for each of the tables indicated in the workbook. Effectively, the application builder system 120, along with the background application service 130 and the application generator 140, generate the zero and low input applications having views (for example, screens) that display data from the workbooks. In some embodiments, the applications have corresponding automations that may relate to data displayed in particular views or on particular screens. These components may generate the applications based on a template or a determination of a sample structure for the views and/or the automations. For example, the if the data pulled from the workbook for the application includes a list of dates and corresponding events, then these components may parse and/or analyze the data for the application to identify which available template is the best for viewing and/or interacting with this data. Ultimately, the components may determine that a calendar or similar template is the best option for the dates and corresponding information. In some embodiments, the structure format of the sheet itself may help determine which template to select. In some embodiments, the templates include the best view options for the data as well as one or more automations related to a particular type of data. For example, when the data is calendar data, the template may include a calendar view and automations for reminders to send e-mails regarding upcoming events.

Additionally, the application builder system 120 may determine whether a change of the data in the workbook would result in a change to the zero input application before making any changes to the zero input application using the application generator 140. For example, if author changes to application data in the workbook only impact data that is not shown in any screens of the zero input application, then the application builder system 120 may determine that no changes to the zero input application are needed and defer updating the zero input application. For example, if the changes in the data apply to columns that are not shown in the zero input application, the zero input application screens would not need to be updated, so no update would be requested.

Alternatively, or additionally, the application builder system 120 may apply one or more rules or templates to data updated in the workbook to identify a type of data being updated and to use to determine aspects to include in the zero input application for the updated data.

In some embodiments, when the author builds application workbooks and modifies them to exclude particular data (for example, certain rows/columns of data), which influences table metadata (which is surfaced through a user interface 112 or through tables). The generated zero input application may allow the author or user to manipulate the metadata directly, and any subsequently developed application workbooks will take advantage of this metadata. Thus, the author may be able to update default settings for the zero input application that saves the author time when making future zero input applications based on the same settings.

The application builder system 120 may use different events as triggers for creating the zero input application corresponding to the data entered into the workbook. For example, the creation of the workbook may trigger creation of the zero input application. In some embodiments, the created zero input application may be automatically updated when data in the workbook is updated and the author may be able to edit the zero input application. In some examples, when the creation of the workbook triggers creation of the zero input application, the created zero input application may be automatically updated when data is updated but the author may not be able to edit the zero input application after creation.

In some embodiments, the trigger for the application builder system 120 creating the zero input application is an author action, for example selection of a button to create the application. Additionally, the created zero input application may be editable by the author and/or may be automatically updated after creation.

Thus, based on the options and triggers described above, the author can create the zero input application with minimal input from the author to create the zero input application. Using the systems described herein, the application builder system 120 creates each zero input application such that, for each table in the workbook, there is a list view, a detail view, and a form. The zero input application is created such that the author can add rows to the table by clicking on an "Add" or similar button in the list view of the zero input application, edit rows by clicking on an "Edit" or similar button in the detail view, or exclude formulas in the form.

The application builder system 120 may create the zero input application such that navigation is enabled for any columns in any table that contains a filter and that navigation links to the same list, detail, and/or form view as was the case for the tables. In some embodiments, the zero input application allows the author to locally filter and/or sort any list view, for example filter picklists by distinct values, numeric values using operators such as "less than", "greater than", and "equal to" to a supplied value, and/or sort any column by descending or ascending value. In some embodiments, if automatic updates to the zero input application results in edits that conflict with changes made to the workspace, the author may receive a notification from the zero input application or the application builder so that the author can accept or reject them.

Alternatively, and/or additionally, the application builder system 120 may provide the author with template applications, which may assist authors that do not know how or what to do in order to generate basic application components (for example, forms) or that are unsure how to apply certain concepts to their own use case (for example, data modeling, connecting workflows, and so forth). In some embodiments, the application builder system 120 allows authors to generate workbooks from a template, which may enable the authors to review examples of applications that the authors want to develop and use the examples to learn and understand how to create similar applications for their use cases. Thus, when the author is creating the new workbook, the application builder system 120 provides the author a number of options: (1) start from a template workbook and customize, (2) upload existing data, or (3) start with a blank workbook. Selecting option 1 gives the author a choice of templates from a number of popular templates. The author may be given the option to browse from other templates, for example created by other authors or supplied by the application builder system 120. Upon selecting a template (for example, a voting application template), the author may adjust particular parameters specific to the author's use case. Alternatively, or additionally, the author having an existing workbook may import a template into the existing workbook. To accomplish this, the application builder system 120 may include an option (for example, a button) on the user interface 112 or 122 that the author can actuate to add a template to the workbook. Adding the template to the existing workbook may give the author options to add corresponding application screens to an existing application or create a new application, for example a zero input application.

Authors having more advanced knowledge of building applications and/or using the application builder system 120 may utilize additional features of the application builder system 120 as compared to more novice authors. The additional features may prompt the authors for additional information and automate certain low-level actions, freeing the authors to focus on more critical actions relevant to their applications. These additional features may include wizards that assist with various functions, including creating, updating, or deleting data, creating, updating, or deleting applications, charts, or other visualizations, creating, updating, or deleting metadata, or interacting with external systems. Wizards may be provided by other authors or by the application builder system 120 and the author may be given options to browse for available wizards.

Figure 2:
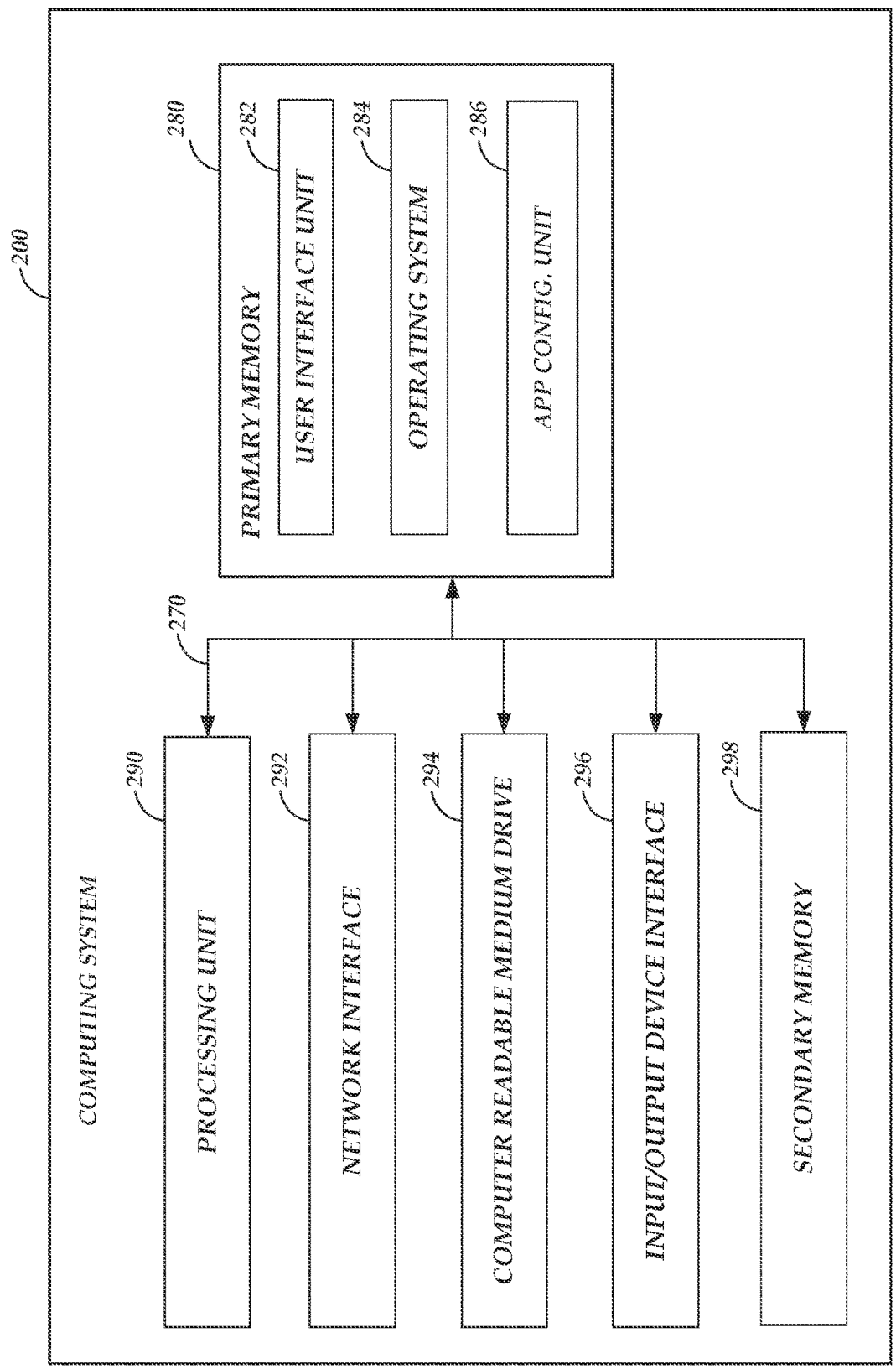
FIG. 2 depicts a general architecture of a computing device providing the computing environment of FIG. 1.

FIG. 2 depicts a general architecture of a computing system 200 implementing one or more of the client devices 102 and the application builder computing environment 110 of FIG. 1. The general architecture of the computing system 200 depicted in FIG. 2 includes an arrangement of computer hardware and software that may be used to implement aspects of the present disclosure. The hardware may be implemented on physical electronic devices, as discussed in greater detail below. The computing system 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the computing system 200 includes a processing unit 290, a network interface 292, a computer readable medium drive 294, and an input/output device interface 296, all of which may communicate with one another by way of a communication bus 270. The network interface 292 may provide connectivity to one or more networks (for example, the network 104) or computing systems (for example, the client devices 102). The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, cloud storage objects or services (for example, Amazon's Simple Storage Service (S3), block and file services (for example, Amazon's Elastic Block Store (EBS) or Elastic File System (EFS), and the like. In some embodiments, all of the primary memory 280 or the secondary memory 298 may utilize one of the tiers of memory devices identified above. The primary memory 280 is assumed for the purposes of description to represent a main working memory of the computing system 200, with a higher speed but lower total capacity than secondary memory 298.

The primary memory 280 may store an operating system 284 that provides computer program instructions for use by the processing unit 290 in the general administration and operation of the computing system 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a web browser or software application installed on the computing device.

In addition to and/or in combination with the user interface unit 282, the memory 280 may include an application configuration unit 286 that facilitates creation, management, and use of web and mobile applications. Illustratively, the application configuration unit 286 may configure the computing system 200 to accept requests and/or commands to create, modify, access, or view a web or mobile application and may implement those requests and/or commands (e.g., by instructing physical host devices implementing the application builder system 120 to route network traffic in a manner corresponding to creation, management, and use of a web or mobile application).

The computing system 200 of FIG. 2 is one illustrative configuration of such a device, of which others are possible. For example, while shown as a single device, the computing system 200 may, in some embodiments, be implemented as multiple physical host devices. In other embodiments, the computing system 200 may be implemented as one or more virtual devices executing on a physical computing device. While described in FIG. 2 as a computing system 200, similar components may be utilized in some embodiments to implement other devices shown in the environment 100 of FIG. 1.

Figure 3A:
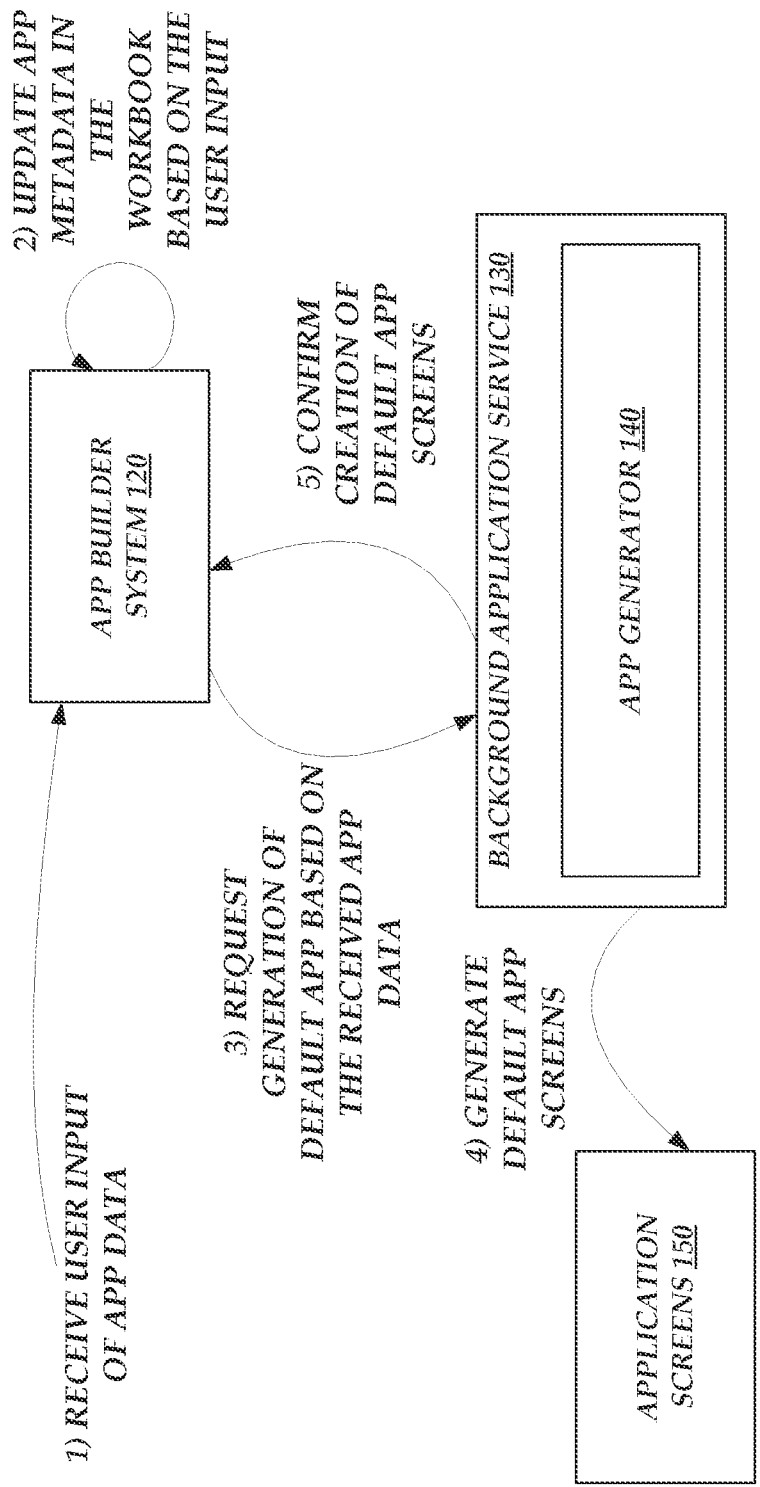
FIGS. 3A-B are flow diagrams depicting illustrative interactions for handling a user input of application data and subsequent generation of application screens based on the application data by an application service of FIG. 1.

With reference to FIG. 3A, illustrative interactions will be described for automatically providing a zero input application (also referred to herein and in the figures as the "default" application), in response to an author entering or modifying data in a workbook associated with the zero input application. For purposes of FIG. 3A, it is assumed that the author has previously established or created an application framework via the application builder system 120 such that the workbook associated with the zero input application already exists and is accessible by the author. Effectively, by the time the interactions shown in FIG. 3A occur, the author is accessing the application builder system 120 associated with the application workbook, for example using one of the client devices 102 via the network 104.

With reference to FIG. 3A, at (1), the application builder system 120 receives author input of application data. The application data may be entered into the application workbook (for example, via the database view described herein) directly by the author via one of the client devices 102 or obtained/imported from a network accessible storage 108 of FIG. 1. The application data may include initial data being entered into the workbook, additional data being appended to existing data in the workbook (for example, that involves adding one or more columns or rows to a table in the workbook), deletion of data from the workbook (for example, that involves deleting one or more columns or rows from a table in the workbook), reformatting of data structures in the workbook, moving or renaming of data structures in the workbook, and so forth.

At (2), the application builder system 120 uses the author input to update the application data and/or the application metadata in the workbook. When the author input is the initial data for the workbook, the application builder system 120 may create data structures (for example, tables), in the workbook with the initial data. As such, the application builder system 120 may make any associations between the initial data and other aspects of the workbook as needed, for example establishing any default parameters and so forth. In some embodiments, the application builder system 120 may generate any automations based on or incorporating the initial data, and so forth. If the author input includes data to be appended to existing data in the workbook, the application builder system 120 may add the author input data to the existing data. Where the author input includes commands to delete specific data, then the application builder system 120 may delete the corresponding data from the workbook, and when the author input includes a change of formatting for the data structure(s) or moves or renames data/structures in the workbook, then the application builder system 120 updates the formatting of the data structure(s) or moves or renames the data/structures in the workbook pursuant to the received author input. Though not shown in FIG. 3A, the application builder system 120 may further update any automations associated with any data changed via the author input received at (1). For example, the application builder system 120 may update any action based on a data condition if the corresponding data changes following (1) and (2).

Therewith or thereafter, at (3), the application builder system 120 generates a request for the background application service 130 to generate or regenerate (e.g., update) a zero input application based on the author input (1). The specifics of the request generated at (3) may depend on the initial author input at (1). Where the author input of application data at (1) was the initial data for the workbook, then the request generated at (3) may comprise a request to create the initial zero input application. When the received author input at (1) is data to append to existing data in the workbook (for example, includes adding one or more columns or rows to an existing table in the workbook), then the application builder system 120 may generate the request at (3) comprising a request to update the zero input application to include the appended data, i.e., the added columns or rows (see discussion with reference to FIGS. 5A and 5B below). When the received author input at (1) is data to be deleted from the workbook (for example, identifies one or more columns to be deleted from a table in the workbook where the columns identify data fields to include for all rows in the table), then the application builder system 120 may generate the request at (3) to comprise a request to delete data, i.e., the identified column(s) or row(s)) from the zero input application. When the received author input at (1) updates formatting of the data in the workbook or moves or renames data/structures in the workbook, then the application builder system 120 may generate the request at (3) to update the formatting of the data or move or rename data/structure in the workbooks of the zero input application to match the author input. Accordingly, the application builder system 120 updates the workbook and requests that the zero input application is updated to match the author input received at (1). If the user input at (1) identifies data values that populate or are to be deleted from the workbook (for example, values in cells in a spreadsheet), then the application builder system 120 may not generate the request at (3) because the structure of the data itself is not changing. Instead, the application builder system 120 may implement a different API that results in a different request at (3), not shown in FIG. 3A, for example one that loads the data in the database into the table shown in an existing zero input application. Thus, the application builder system 120 may generate the request at (3) for changes that affect data structure, formatting, location, name, and so forth and request synchronization of data in the table for changes in values of the data through different requests.

At (4), the background application service 130 utilizes the application generator 140 to generate one or more screens for the zero input application, in response to the request received at (3) as generated by the application builder system 120. As described herein, the application generator 140 may create or update the zero input application with corresponding screens or pages in response to the received request at (3) or generate only representations of the corresponding screens or pages without creating an actual application. The determination of creating the actual zero input application screens or representations of the screens may be based on a default setting of one of the workbook or the application builder system 120 or an indicator or input received with the author input of application data (1), where the author requests either the application with screens or pages or representations of the screens or pages. Regardless of the selection or determination, the processes by the application generator 140 at (4) are generally the same, with the difference being actual screens for the zero input application being generated or representations of the screens. Thus, at (4), the application generator 140 generates initial screens (or representations of initial screens) when the application data received from the author is the initial data for the workbook and, thus, application. When the author input at (1) is the data to append to existing data (for example, that involves adding one or more columns or rows to a table in the workbook), then the application generator 140 generates screens (or screen representations) showing the appended data. Generating the screens or screen representations may comprise generating replacement screens including the existing and appended data, updating replacement screens or generating existing screens to show only the appended data, or updating existing screens (or representations) to further include the appended data with the existing data.

When the author input is merely adding or deleting data values from existing data (for example, changes to the table that do not necessarily impact other rows or columns involves deleting one or more columns or rows from a table in the workbook), then the application generator 140 may generate screens (or screen representations) adding or excluding the deleted data with respect to previously shown data. Generating the screens or screen representations excluding data may comprise synchronizing data displayed with the data in the database, thus adding or excluding data relative to the database as opposed to regenerating screens.

When the author input is updating formatting of data in existing data, then the application generator 140 generates screens (or screen representations) with the updated formatting. Generating the screens or screen representations with the updated formatting may comprise generating replacement screens (or screen representations) showing the existing data with the updated formatting or updating replacement screens (or screen representations) to show the existing data with the updated formatting.

At (5), once the application generator 140 completes generating the application screens 150 (or representations thereof) at (4) as described herein, the background application service 130 may generate a confirmation message to the application builder system 120 that the screens (or representations) for the zero input application were generated based on the author input from (1).

As described herein, completion of the updates to the application data (for example, updates that change a structure of the data and not just data values in the application data) in the workbook alone according to the author input may not represent completion of the updating of the application data resulting from the author input of application data at (1). The application builder system 120 may treat multiple interactions of FIG. 3A as an atomic operation, such that all such interactions succeed or fail together. For example, each of interactions (2)-(5) may form an atomic operation, such that failure of the service 120 to generate a no input application, for example, also causes the request to change the format and/or structure of the workbook to fail. Only once each of (2), (3), (4), and (5) of FIG. 3A are completed (simultaneously or in a sequential order) is the atomic operation completed. In this manner, the application generated via the interactions of FIG. 3A may be seen by the author as constantly up-to-date.

To ensure automatic update of the zero input application based on changes to the corresponding data, the application builder system 120 may identify triggers based on particular data modifications. For example, each of the below data modifications may trigger the automatic update of the zero input application and may be considered one or more specifics of data being updated in the application, which corresponds to any data or aspects (or subset thereof) of the application being updated by the author or user:

Table creation
Table deletion
Table renaming
Table moving
Column/row addition
Column/row deletion
Column/row rearrangement
Column/row renaming
Table/column/row metadata updates Furthermore, the automatic update of the zero input application may include updates to all aspects of the zero input application, including screens, expressions, and automations for any updated table. In some instances, the automatic updates of the zero input application may result in an increased latency caused by the deletion and recreation of assets associated with the zero input application and the updated data. The application builder system 120 (and the application generator 140) may mitigate the increased latency caused by the automatic updates to the zero input application by one or more of controlling a number of assets of the zero input application to be updated, increasing speeds of asset updates, or reducing a total number of asset in the zero input application (thereby reducing an amount of assets to update in view of the change). Examples of factors impacted by the automatic update of the zero input applications include latency for serializing assets, latency for persisting individual assets, and counts for assets updated for the zero input application.

An example zero input application may have hundreds of assets. If each of these assets are to be updated or changed, the update may introduce an extensive amount of latency just from the numbers of assets to update. Options for reducing the associated latency include: (1) identifying exact changes and generating/updating assets accordingly and (2) calculating a delta between new and old assets. Option 1 may be expensive from a resource and development perspective. Option 1 may utilize conditional handling of triggers and generating required assets and assets to be removed. Option 1 may be error prone because appending and removing is performed on various assets. Option 2 may involve identifying a delta in the new and old assets (i.e., assets before and after update) for high level objects (for example, screens, expressions, and automations). If there is a delta, the complete asset is updated. Thus, any change in an object may result in a rewrite of all associated assets. Option 2 may allow elimination of most of the expression created during the triggers identified above and also reduce a number of automations required to be updated in particular types of updates (for example, column updates).

Alternatively, the application building system 120 may improve write speeds for assets or reduce a number of assets associated with each table in the workbook.

Figure 3B:
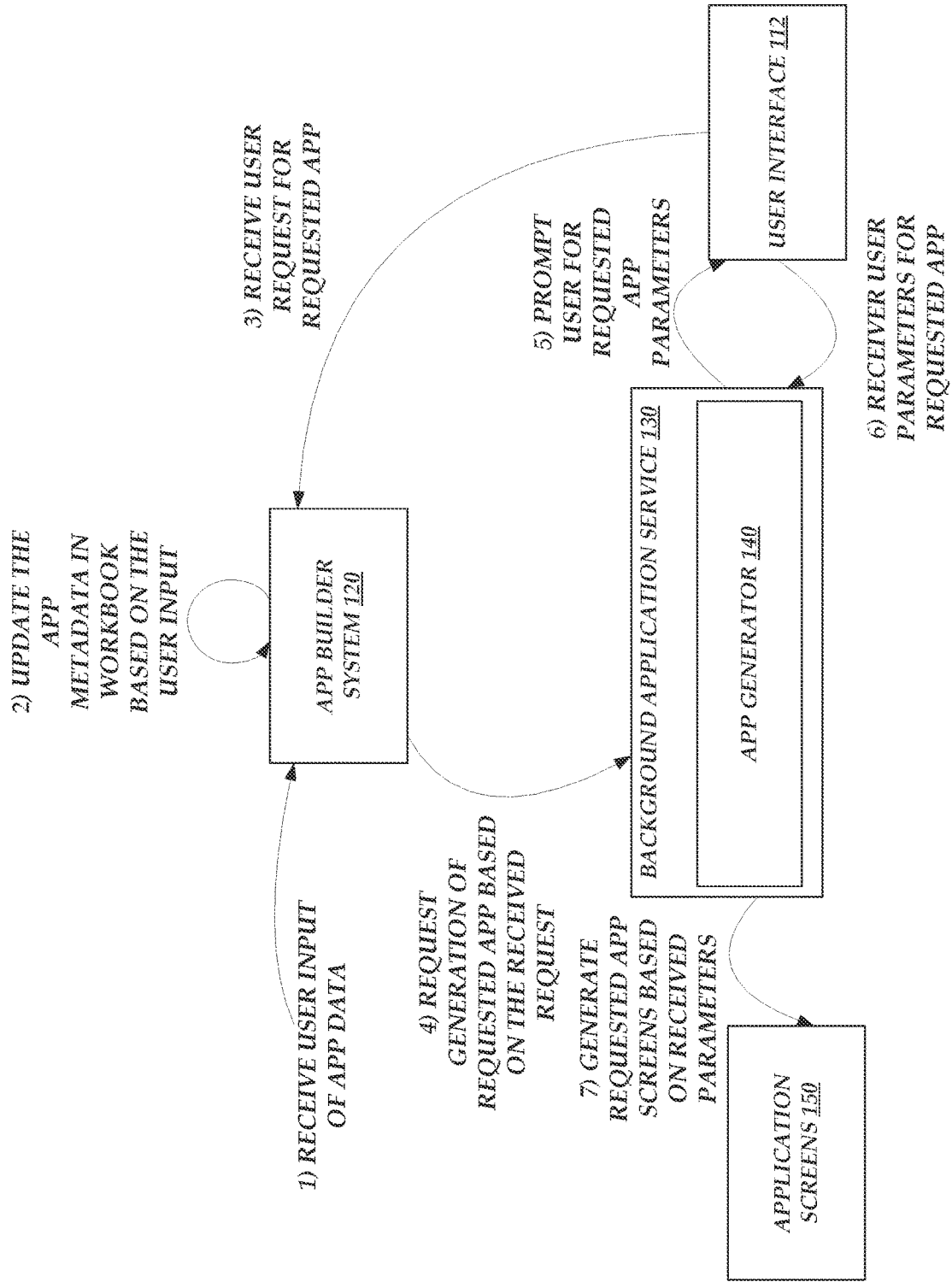

With reference to FIG. 3B, illustrative interactions will be described for providing a low input application, for example automatically in response an author entering or modifying data in a workbook associated with the low input application or in response to the author explicitly requesting the low input application (referred to in the figures as the "requested" application) be generated. For purposes of FIG. 3B, it is assumed that the author has previously established or created an application framework via the application builder system 120 such that the workbook associated with the low input application already exists and is accessible by the author. Effectively, by the time the interactions shown in FIG. 3B occur, the author has been authenticated (if appropriate) and is accessing the application builder system 120 to update a previously created application workbook, for example using one of the client devices 102 via the network 104.

With further reference to FIG. 3B, at (1), the application builder system 120 receives author input of application data. The application data may be entered into the application workbook (for example, via the database view described herein) directly by the author via one of the client devices 102 or obtained/imported from a network accessible storage 108 of FIG. 1. The application data may include initial data being entered into the workbook, additional data being appended to existing data in the workbook (for example, that involves adding one or more columns or rows to a table in the workbook), deletion of data from the workbook (for example, that involves deleting one or more columns or rows from a table in the workbook), reformatting of data structures in the workbook, moving or renaming of data structures in the workbook, and so forth.

At (2), the application builder system 120 uses the author input to update the application data and/or the application metadata in the workbook, similar to the step (2) of FIG. 3A. Accordingly, for simplicity, the duplicate functionality will not be repeated here in its entirety.

Therewith, or thereafter, at (3), the application builder system 120 receives an author request to create the low input application. In one embodiment, the author request to create the low input application may be received as part of the author input of app data at (1), such that (1) and (3) are effectively combined into a single interaction. In some embodiments, though not shown in FIG. 3B, the request to create the low input application may be implicit based on the update of or to application data. In some embodiments, the author request for the low input shown at (3) is triggered by the author selecting a button or similar trigger.

Therewith or thereafter, at (4), the application builder system 120 generates a request for the background application service 130 to generate the low input application based on the author input (1) and author request (3), as shown. The interaction at (4) in FIG. 3B is similar to the interaction (3) of FIG. 3A. Accordingly, for simplicity, the duplicate functionality will not be repeated here in its entirety.

At interaction (5) of FIG. 3B, the background application service 130 prompts the author for one or more parameters of the application. For example, the background application service 130 prompts the author to identify the type of low input application desired (for example, an inventory application, a calendar application, a time-sheet application, another template, and so forth). The prompt may enable the author to select particular data to include in the application and customizable information for the low input application being generated.

At (6), the background application service 130 receives the author selected parameters for the low input application being generated. Though not shown, the background application service 130 passes the received parameters on to the application generators 140.

At (7), the background application service 130 utilizes the application generator 140 to generate one or more screens (or screen representations) for the low input application, in response to the request received at (4) and the author parameters received at (6). As described herein, the application generator 140 may create an actual low input application with corresponding screens or pages in response to the received request at (4) and parameters at (6) or generate only representations of the corresponding screens or pages without creating an actual application. The determination of creating the actual low input application or only representations may be based on a default setting of one of the workbook or the application builder system 120 or an indicator or input received with the author input of application data (1) or application parameters at (6), where the author requests either the application with screens or pages or representations of the screens or pages. Regardless of the selection or determination, the processes by the application generator 140 at (7) are generally the same, with the difference being actual screens for the zero input application being generated or representations of the screens. The remainder of interaction (7) in FIG. 3B is similar to the interaction (4) of FIG. 3A. Accordingly, for simplicity, the duplicate functionality will not be repeated here in its entirety.

In some embodiments, once the application generator 140 completes generating the application screens 150 (or representations thereof) at (7) as described herein, the background application service 130 may terminate with or without generating a confirmation message to the application builder system 120 that the screens (or representations) for the low input application were generated based on the author input from (1) and (6). This is a difference that may be implemented between the zero input application and the low input application. Specifically, the low input application may or may not perform edits to the application data and application screens as an atomic operation, as described herein with reference to FIG. 3A. In some embodiments, the low input application interactions of FIG. 3B may also perform edits to the application data and application screens as the atomic operations, comprising the interactions of (2), (4), (5), (6), and (7), along with a confirmation interaction between the background application service 130 and the application builder system 120, not shown. Thus, only once each of (2), (4), (5), (6), (7), and the confirmation interaction that is not shown of FIG. 3B are completed (simultaneously or in a sequential order) is the atomic write completed. In this manner, the application generated via the interactions of FIG. 3A may be seen by the author as constantly up-to-date.

In some embodiments, one or more of the interactions shown in FIGS. 3A and 3B may be modified to omit certain interactions (e.g., interaction (3) of FIG. 3B). In some instances, the application builder system 120 may receive the author request in (1) or automatically request the generation of the low input application without receiving an explicit author request, similar to the interactions of FIG. 3A.

Generating and/or updating applications, as described with reference to FIGS. 3A and 3B, may comprise updating one or both of the application views and automations associated therewith based on structural changes to data in the workbook. Generating the applications may further comprise generating a single page application, for example a web page generated with HTML and/or corresponding coding. The application generator 140 may generate the web page with HTML and/or code the mobile application with any of various coding languages. In some embodiments, the application generator 140 generates the web and/or mobile applications with appropriate services and/or APIs that link the views and/or automations to the underlying data in the workbook. Such links may allow upload/downloading of data and/or navigate through the application without refreshing the application (for example, a web browser or corresponding application).

Thus, the application generator 140 may create applications with views and automations that link to the data in the workbook. For example, when a particular template application is selected or a new application is created from scratch, the application generator 140 may generate the corresponding views by generating the corresponding HTML or code. The HTML or code for the views may include the necessary calls and links to the data in the workbook so that the views can view and/or modify data as appropriate (for example, download and upload data in the workbook). Similarly, the automations generated by the application generator 140 may include corresponding code that allows the automations to monitor triggers and/or perform actions. Thus, whether embodied as a web application or a mobile application, the application generated by the application generator 140 may include all links and coding to enable the views and automations to interact with the data in the workbook.

Figure 4:
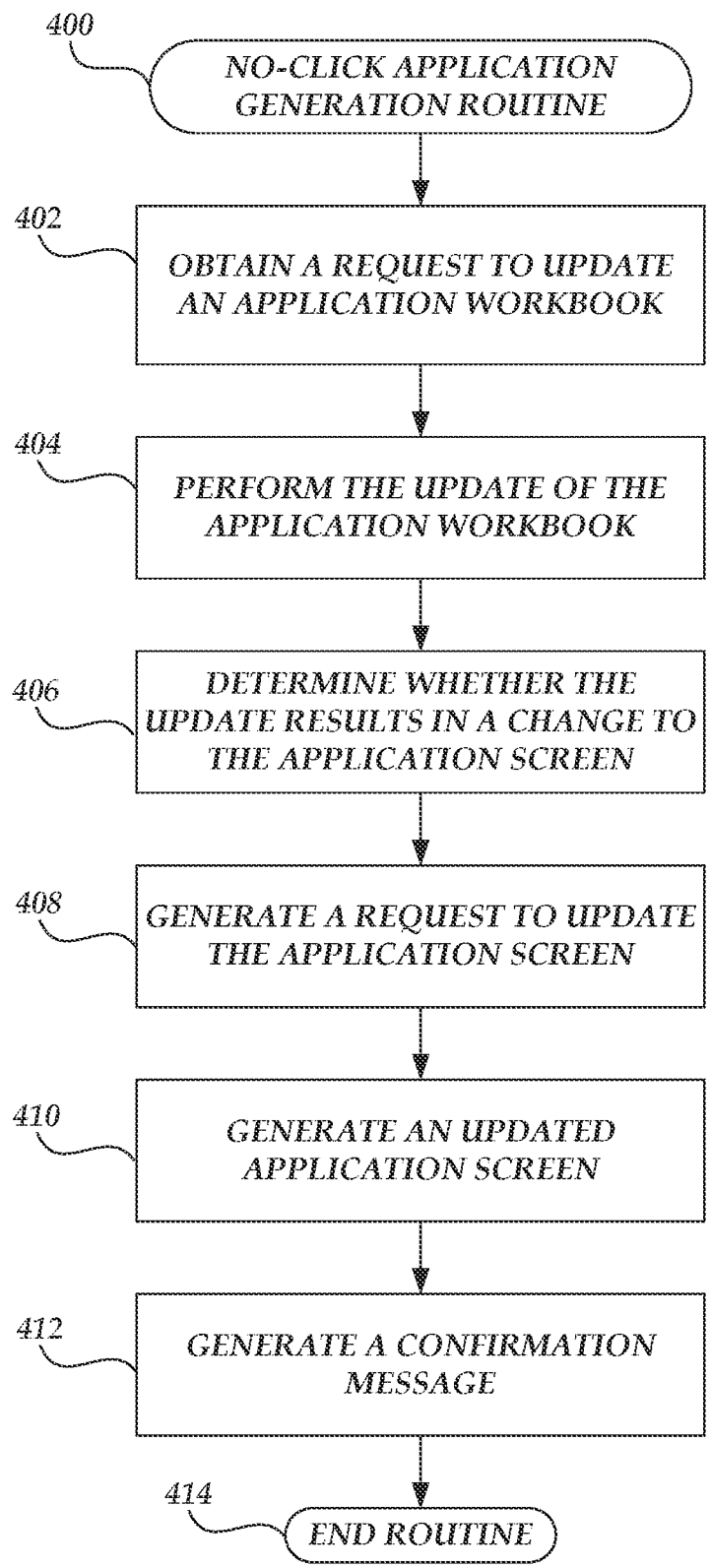
FIG. 4 is a flow chart depicting an illustrative routine for making updates to data in an application workbook and automatically updating corresponding application visualizations with the application builder system of FIG. 1.

With reference to FIG. 4, an illustrative routine 400 will be described for making updates to data in an application workbook and automatically updating corresponding application visualizations (e.g., a zero input application generation routine), in accordance with embodiments of the present disclosure. The routine 400 may be carried out, for example, by the computing environment 110.

The routine 400 begins at block 402, where the computing environment 110 (e.g., the application builder system 120) obtains a request to update data in an application workbook. The request comprises an indication of a type of update being requested (for example, appending of data, deletion of data, changing of formatting, and so forth) and the data that is being updated (for example, a listing of data to be deleted or added, and so forth). The application workbook may correspond to an application workbook stored in the workbook storage 124. The application workbook may be one of a newly created workbook or a previously existing workbook. The application workbook may also comprise at least one application screen or visualization that displays at least some of the data stored in the application workbook.

Thereafter, at block 404, the computing environment 110 (e.g., the application builder system 120) performs the requested update of the application workbook. As such, this may comprise one or more of adding, deleting, reformatting, etc., the data in the application workbook identified in the request according to the request. Completing the requested update may result in an updated application workbook being generated or may result in the updated application workbook.

Thereafter; at block 406, the computing environment 110 (e.g., the application builder system 120) determines whether the performed update of the application workbook results in a change to data displayed on the application screen. The application builder system 120 performs such a determination by comparing the updated application workbook with the application screen (or any application screen of the application workbook) to determine whether data on the application screen (or any application screen for the application workbook) was updated in the application workbook. If data displayed on one of the application screens was updated in the application workbook in response to the obtained request, then the application builder system 120 determines that an update of the application screens is needed due to a change in the data displayed on the application screen.

Thereafter; at block 408, when the performed update of the application workbook does result in a change to data displayed on the application screen, the computing environment 110 (e.g., the application builder system 120) may generate a request (e.g., to the background application service 130) to update the application screen based on the received request. As described herein, the request to update the application screen may be automatic, triggered by the update to the corresponding data in the application workbook and the determined change to the application screen in view of the update. Additionally, the update may be automatic when the application is a zero input application. If the application is another type of application (for example, low input application or any other type of application), then the request to update the application screen may not be automatic. Alternatively, the author that submits the original request may request that the application screen be updated, and the application builder system 120 may generate the request to update the application screen to the background application service 130 based on the author's request.

Thereafter; at block 410, the computing environment 110 (e.g., the background application service 130) generates an updated application screen based on the updated application workbook. Thus, any updates in the application workbook resulting from the original author request results in corresponding changes to the application screen.

Thereafter, at block 412, the computing environment 110 (e.g., the background application service 130) generates a confirmation message to the application builder system 120 that the updated application screen has been generated to match the updated application workbook.

Figure 5A:
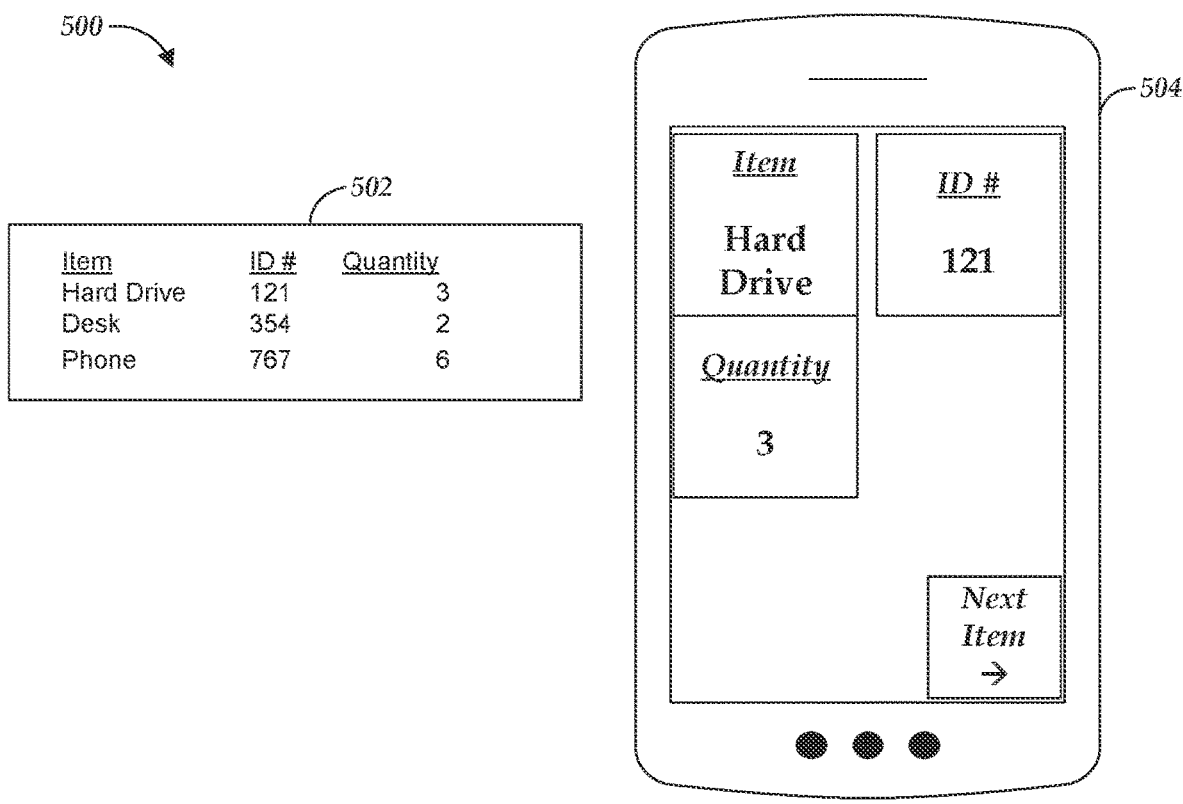
FIGS. 5A and 5B are diagrams showing how application data input by the user can be displayed on a mobile device via a mobile application generated, at least in part, by the application builder computer environment of FIG. 1.
Figure 5B:
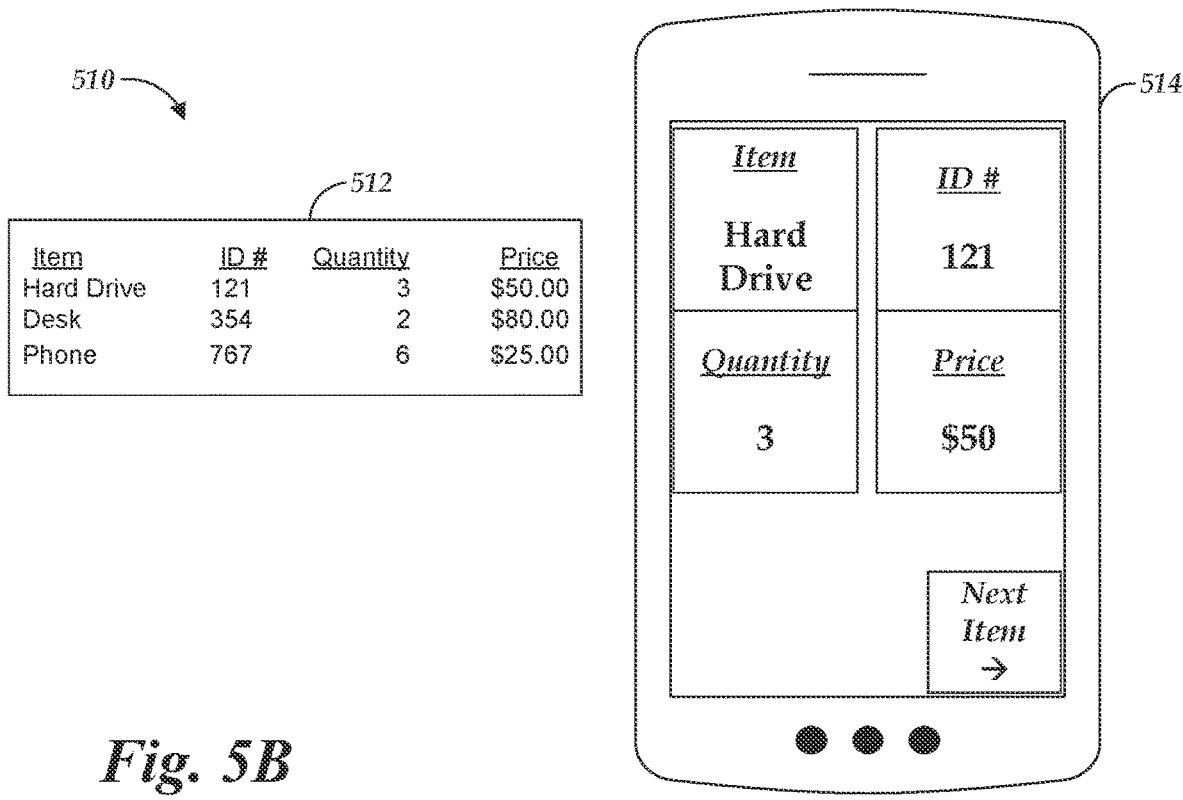

FIGS. 5A and 5B are diagrams showing how application data input by the author is displayed on a mobile device via a mobile application generated, at least in part, by the application builder computing environment of FIG. 1. FIG. 5A shows an example table 502 of data that is being added to a newly created application workbook. The table 502 is received by the application builder system 120 via the user interface 112 or 122 and then communicated to the background application service 130, for example via a data add API. Screen 504 shows an example of what application screen the application generator 140 will generate based on the data in table 502. For example, the table 502 is an inventory table with three rows corresponding to three items in the inventory and three columns corresponding to three pieces of information for each item in the inventory. The table 502 shows a first entry corresponding to inventory of the first item (a hard drive), that has an ID number 121, and a quantity of 3 in the inventory. The inventory also includes a second entry corresponding to a second item (a desk), with an ID number 354, and a quantity of 2 in the inventory, as well as an entry of a third item (a phone), with an ID number 767, and a quantity of 6 in the inventory. As described herein, the author may identify that the data in the table is inventory data and request an inventory template for the screen 504. Alternatively, or additionally, the application builder system 120 may review the data in the table 502 and select an appropriate template or format for the screen 504. As shown, the screen displays information for one row in the table 502. The displayed information relates to the hard drive in the inventory. The screen 504 shows the detailed inventory information, including the item name, the ID number, and the quantity. The screen 504 also include a navigation button to review detailed inventory information for the next item in the table 502, i.e., the desk.

FIG. 5B shows an example table 512 of data that is indicative of an update or change to the structure of the data or table, for example as a result of data being added to the application workbook (e.g., inclusion of a new field for records of the workbook or other change in format of the records). The table 512 corresponds to the table 502 of FIG. 5A after the update to the structure of the table. In some instances, the update that changes the structure of the column or corresponding record is received by the application builder system 120 via the user interface 112 or 122 and then communicated to the background application service 130, for example via a data add API. Screen 514 shows an example of what updates to the screen 504 the application generator 140 will generate based on the updated data in the table 512. The table 512 shows a change to a structure of the table or record; specifically, the addition of a new column "price" reflecting a new field for records into the table 512. While the newly added column in FIG. 5B shows pricing information for all three existing records, in some instances a new column may exclude field values for one or more records. As modified in FIG. 5B, the table 512 includes the three rows corresponding to the three items in the inventory (records) and four columns corresponding to four (total) pieces of information (fields) for each item in the inventory. As described herein, the author may identify that the data in the table is inventory data and request the inventory template for the screen 514. Alternatively, or additionally, the application builder system 120 may review the data in the table 512 and select an appropriate template or format for the screen 514.

As discussed above, this change in structure of the table is distinct from mere addition of new records to the table, which would simply add new data conforming to an existing structure and, as such, does not alter the structure of the table (i.e., the fields of existing records in the table). Due to the change in the structure of the table, when the column is added to the table 502 to generate the table 512, the screen 504 is updated to show the screen 514. Specifically, in FIG. 5B, the screen 514 shows the detailed inventory information for an individual item (corresponding to a record in the table 512), including the item name, the ID number, the quantity, and the newly-added price. The screen 514 also include a navigation button to review detailed inventory information for the next item in the table 512, i.e., the desk. Thus, when the systems and methods herein determine a change to the structure of a record in the workbook (for example, an addition/deletion of one or more columns in the table or workbook, an addition/deletion of one or more tables in the workbook, and/or a change in the structure of the column or table), the systems and methods may automatically update the application screens corresponding to the data so that the user can quickly and automatically view changes corresponding to changes in the data.

The systems and methods described herein will convert updates to structures of records in the workbooks based on information or tables, similar to tables 502 and 512 as shown in FIGS. 5A and 5B to updates to corresponding application screens, for example as shown in screens 504 and 514. For example, a change in the price of the hard drive from $50 to $75 between the tables 502 and 512 would not result in the background application service 130 requesting that the application generator 140 generate the screen 504, because a change in the value in the column is not a structural change to the record. Rather, the data values displayed would update based on the change in the workbook without a change to the screen 504, because the screen 504 as previously configured would retrieve any change in data value from the table 502. Similarly, addition of a new item to the table (another record) would not result the background application service 130 requesting that the application generator 140 generate the screen 504, because the screen 504 as previously configured enables iteration through items in the table 502.

In some instances, the systems and methods herein can adjust formatting based on the screen of a device on which the data is being displayed. For example, the systems and methods can limit a number of columns/rows displayed in/on the default application. In some embodiments, the systems and methods can adapt the application being generated (and, correspondingly the structure of the records) based on the display on which the screens will be displayed. For example, the application generator 140 can limit the number of columns and/or rows displayed constrained by the size of the display. Further, the application generator 140 can limit the amount of text shown in fields, for example paragraph data and the like. The application generator 140 may be able to intelligently adapt application screen generation according to a target display (e.g., the display on which the screen(s) will be displayed).

In some embodiments, the systems and methods (for example, via the background application service 130) may generate notifications in the background that will notify a default app when there is a data update to the table in terms of data, as opposed to a structural change. Accordingly, if multiple people are working with an application (for example, in a multi-user session) and there is an update from one user, then other users of the same app may see that change being reflected in their screens. Furthermore, for any changes that directly occur inside a table (for example, addition of a new row to the table), that addition may also be reflected in the application screens.

In contrast to the non-structural changes described above, when the user adds the additional (price) column to table 502, then the background application service 130 may request that the application generator 140 generate an updated screen 514 that includes the newly added column, because adding the column is a structural change to the records and thus an update to the screen 504 is required in order to show the newly added field.

In some embodiments, rows and columns of a table represent different information. For example, in some tables, columns represent different fields of data while rows represent different items. With reference to table 502, the columns show different pieces of information (i.e., fields) that are included for each item identified in the rows of the table 502. With reference to the discussion above, the addition of rows to the table 502 may not be handled as an update to the table (for example, not changing a structure of the table 502) and are handled as synchronization updates. In such a table, the addition of columns to the table 502 may be an update to the table (for example, changing the structure of the table 502) and may be handled as changes to the no or low input application, resulting in generation or regeneration of the corresponding app view. Alternatively, the rows and columns of the table 502 may be swapped such that the rows represent fields and the columns represent the items, such that additions of the rows are handled as an update to the table that do change the structure of the table 502 while the changes to the columns are handled as synchronization updates. Thus, the change in the structure of a record associated with the updated data can comprise one or more of an addition, removal, or change in a row or column (depending on which of the rows or columns of the table are associated with fields of records), an addition of a table, a removal of a table, or a change in a table in the workbook. More generally, changes to the structure of the table may comprise or be defined as a change in one or more fields of the table (including creation of a new table or removal of a table, as any table must generally have at least one new field).

In some instances, changing the structure corresponds to making a change in the workbook and/or tables that affect more than a single entry or record. For example, in a table that uses columns to define fields and rows to identify records, a change to any column of the table alters each record in the table. Conversely, a change to a row of the table affects only that row. Similarly, the addition or deletion of a table necessarily creates at least one field for that table and is, as such, a structural change. As such, any modification to a table or database that causes modification to multiple records of the table or database may be viewed as a structural change. The systems and methods herein, for example applying the application generator 140, automatically identify additions/deletions/changes to structure of the workbooks or tables as opposed to merely additions/deletions/changes to entries in the workbooks or tables. Based on such identification of changes to structure of the records, the application generator 140 can automatically update the screens for the application to account for the updated structure of the records associated with the table or workbook, thereby simplifying use of the workbook and corresponding apps by the user and enabling automatic creation of updated screens.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining, by a computing device implementing an application builder, a request for an update of data in an application workbook for display via an application, wherein the data in the application workbook is configured in the application workbook according to a data structure, wherein the application provides a representation of the data in the application workbook based on the data structure, the request comprising:
   an indication of a type of update being requested, and
   at least a subset of the data in the application workbook being updated,
   wherein the application workbook is one of a newly created workbook or a previously existing workbook and wherein the type of update comprises one or more of an addition of new data into the newly created workbook, an addition of new data into the previously existing workbook, a deletion of existing data from the previously existing workbook, or a modification of existing data in the previously existing workbook;
   performing, by the computing device, the update of the data in the application workbook based on the type of update and the at least a subset of the data in the application workbook being updated, wherein one or more first updates of the data in the application workbook cause the data structure to be modified and one or more second updates of the data in the application workbook do not cause the data structure to be modified;
   determining, by the computing device, that the performed update of the data in the application workbook results in a modification of the data structure;
   in response to determining that the performed update of the data in the application workbook results in the modification of the data structure, generating, by the computing device, an updated visualization based on the obtained request and the modification of the data structure, wherein the updated visualization is generated automatically based on the performed update of the data in the application workbook, wherein performance of at least one of the one or more second updates of the data in the application workbook causes updating of one or more data values of the updated visualization; and
   causing display, by the computing device, on a user computing device, of the updated visualization via the application.

2. The computer-implemented method of claim 1, wherein the data in the application workbook comprises a set of tables and wherein performing the update of the data in the application workbook comprise performing an update of at least one table of the set of tables.

3. The computer-implemented method of claim 2, wherein the set of tables is organized in a database.

4. The computer-implemented method of claim 3, wherein the database is stored in a local memory with a processor that performs the computer-implemented method.

5. The computer-implemented method of claim 3, wherein the database is formed as a set of sheets in a spreadsheet.

6. The computer-implemented method of claim 1, further comprising:
   providing, by the computing device, a prompt; and
   receiving, by the computing device, user selected parameters in response to the prompt,
   wherein generating the updated visualization is further based on the user selected parameters.

7. The computer-implemented method of claim 6, wherein the user selected parameters comprise at least one of a type of visualization to be generated or particular data to include in the updated visualization.

8. The computer-implemented method of claim 1, wherein the updated visualization comprises one or more navigable links to enable a user to navigate to different screens of the updated visualization.

9. The computer-implemented method of claim 1, further comprising generating, by the computing device, an editable visualization based on the updated visualization, wherein editing of the editable visualization by users is enabled and editing of the updated visualization by the users is disabled.

10. The computer-implemented method of claim 1, wherein the modification of the data structure comprises one or more of an addition of a column, a removal of a column, a change in a column, an addition of a table, a removal of a table, or a change in a table in the application workbook.

11. The computer-implemented method of claim 1, further comprising selecting a template for the updated visualization, wherein generating the updated visualization is further based on the selected template.

12. A system for generating a visualization of an application workbook for display via an application, wherein the system implements an application builder, the system comprising:
   a data store storing data associated with the application workbook;
   a user interface configured to provide user access to the data store and the data stored therein; and
   one or more processors configured to execute instructions stored in a non-transitory computer-readable memory to:
      obtain a request for an update of data in the application workbook, wherein the application workbook is one of a newly created workbook or a previously existing workbook, wherein the data in the application workbook is configured in the application workbook according to a data structure, wherein the application provides a representation of the data in the application workbook based on the data structure;
      perform the update of the data in the application workbook, wherein one or more first updates of the data in the application workbook cause the data structure to be modified and one or more second updates of the data in the application workbook do not cause the data structure to be modified;
      determine that the performed update of the data in the application workbook results in a modification of the data structure;
      in response to determining that the performed update of the data in the application workbook results in the modification of the data structure, generate the visualization based on the obtained request and the modification of the data structure, and wherein the visualization is generated automatically based on the performed update of the data in the application workbook, wherein performance of at least one of the one or more second updates of the data in the application workbook causes updating of one or more data values of the visualization; and
      cause display, on a client device, of the visualization via the application.

13. The system of claim 12, wherein the data in the application workbook comprises a set of tables, wherein performing the update of the data in the application workbook comprises performing an update of at least one table of the set of tables.

14. The system of claim 12, wherein the one or more processors are further configured to execute the instructions to generate a prompt for a user to identify one or more parameters of the application, and wherein the user interface is further configured to:
   provide the prompt via the user interface; and
   receive user selected parameters in response to the prompt, and
   wherein generating the visualization is further based on the user selected parameters.

15. The system of claim 14, wherein the user selected parameters comprise at least one of a type of visualization to be generated or particular data to include in the visualization.

16. The system of claim 12, wherein performing the update of the application workbook comprises adding data to the application workbook, and wherein one or more visual objects are added to the visualization based on the update of the data in the application workbook, the one or more visual objects corresponding to the added data.

17. The system of claim 12, wherein the visualization comprises one or more navigable links to enable a user to navigate to different screens of the visualization.

18. A computer-implemented method comprising:
   obtaining, by a first computing device implementing an application builder, a request for an update of data in a data set, wherein the data in the data set is configured in the data set according to a data structure, the request comprising:
      an indication of a type of update being requested, and
      at least a subset of the data in the data set being updated,
      wherein the data set is one of a newly created data set or a previously existing data set and wherein the type of update comprises one or more of an addition of new data into the newly created data set, an addition of new data into the previously existing data set, a deletion of existing data from the previously existing data set, or a modification of existing data in the previously existing data set;
   performing, by the first computing device, the update of the data in the data set based on the type of update and the at least a subset of the data in the data set being updated, wherein one or more first updates of the data in the data set cause the data structure to be modified and one or more second updates of the data in the data set do not cause the data structure to be modified;

in response to determining that the performed update of the data in the data set results in a modification of the data structure, generating, by the first computing device, an updated visualization of the data in the data set based on the performed update of the data in the data set, wherein the updated visualization is generated automatically based on the performed update of the data in the data set, wherein performance of at least one of the one or more second updates of the data in the data set causes updating of one or more data values of the updated visualization; and causing display, by the first computing device, on a second computing device, of the updated visualization.

19. The method of claim 18, wherein the data set comprises data stored as a set of sheets in a spreadsheet.

20. The method of claim 18, further comprising:

generating, by the first computing device, a prompt;

providing, by the first computing device, the prompt; and receiving, by the first computing device, user selected parameters in response to the prompt, wherein updating the visualization is further based on the user selected parameters.

21. The method of claim 20, wherein the user selected parameters comprise a type of visualization to be generated and/or particular data to include in the visualization.

22. The method of claim 18, wherein the updated visualization comprises one or more navigable links to enable a user to navigate to different screens of the updated visualization.

23. The method of claim 18, wherein performing the update of the data in the data set comprises adding data to the data set and wherein one or more visual objects are added to the visualization, the one or more visual objects corresponding to the added data.

* * * * *